Figure 1:
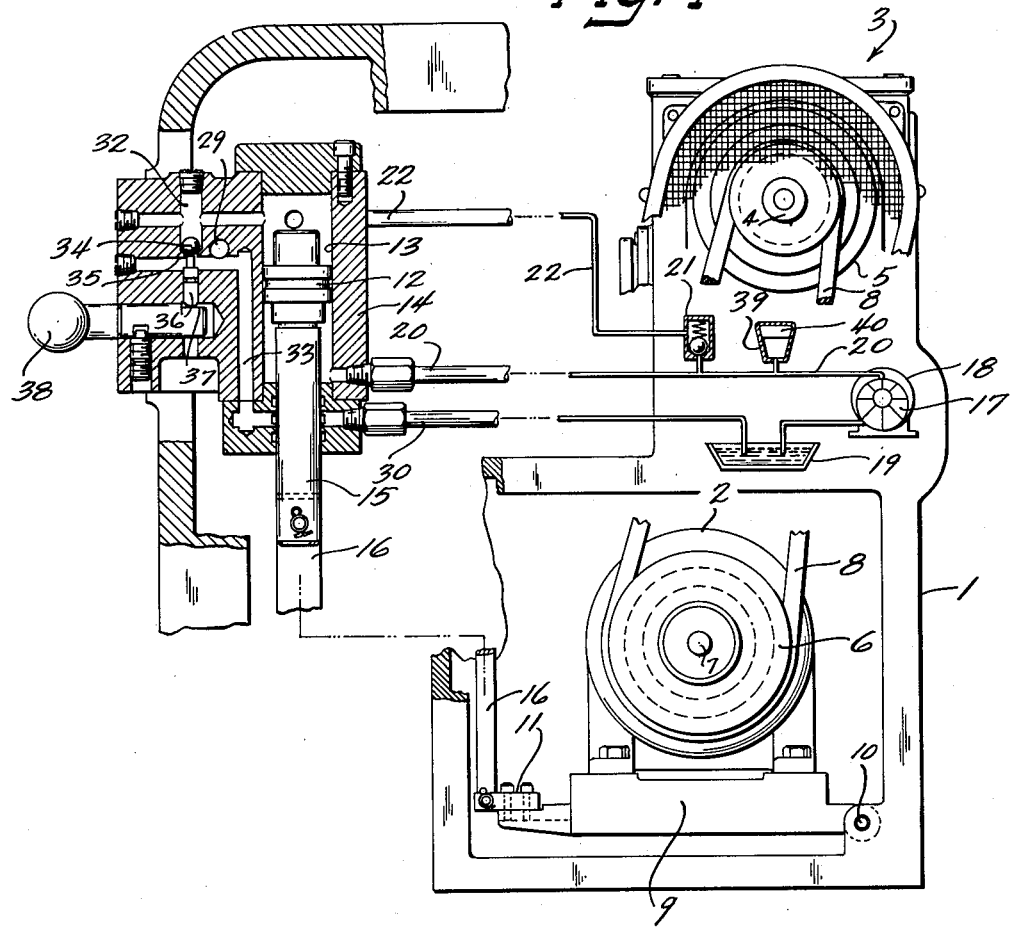

Feb. 28, 1956 L. A. LEIFER 2,736,207
HYDRAULIC MOTOR ADJUSTMENT FOR MACHINE TOOLS
Filed Dec. 20, 1951

INVENTOR.
Lorenz A. Leifer
BY Andrus & Scales
Attorneys

United States Patent Office 2,736,207
Patented Feb. 28, 1956

2,736,207

HYDRAULIC MOTOR ADJUSTMENT FOR MACHINE TOOLS

Lorenz Albert Leifer, Madison, Wis., assignor to Gisholt Machine Company, Madison, Wis., a corporation of Wisconsin Application December 20, 1951, Serial No. 262,615

2 Claims. (Cl. 74—242.15)

This invention relates to motor driven machine tools having a belt drive requiring frequent adjustment.

The invention provides for the hydraulic adjustment of the motor whereby the desired tension of the belt is maintained throughout the operation of the lathe and for moving the motor allowing belt adjustment or replacement, or for relieving the belt of all tension while the motor and the lathe are not in operation.

An object of the invention is to provide for the predetermined degree of belt tensioning which assures maximum belt-life.

Another object is to provide for the movement of the motor necessary for replacement or adjustment of the belt by hydraulic means which is capable of supporting the motor while the motor and machine tool are not in operation.

Another object is to provide for the uniform tension of the belt irrespective of the position of the motor or changes in the length of the belt.

Another object is to utilize the usual fluid supply system of hydraulic operated lathes or other machine tools to effect the desired tensioning of the belt by predetermined pressure actuation of the motor mounting.

These and other objects and advantages will be more fully set forth in the following description of a preferred embodiment of the invention illustrated in the accompanying drawings.

Figure 2:
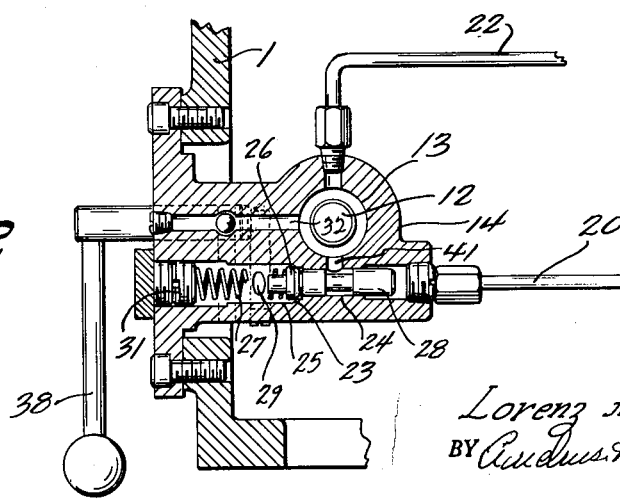

In the drawings:

Figure 1 is an end elevation of a lathe broken away and sectioned to show the motor which drives the spindle of the lathe; the motor is pivotally mounted for support on one side thereof; the enlarged sectional view of the cylinder member shown includes the control valve therefor and the piston therein which supports the other side of the motor by fluid pressure acting against the underside of the piston; the hydraulic circuit is shown diagrammatically and provides the supply of fluid under pressure for operation of the piston; and Fig. 2 is a detail horizontal section through the cylinder member to show the adjustable pressure release for maintaining the desired pivotal support of the motor.

The cast structure shown in the drawings forms the base 1 of the machine tool which is driven by the motor 2 and which supports the headstock 3 carrying the spindle or driven shaft 4. The pulleys or sheaves 5 and 6 are mounted on shaft 4 and the shaft 7 of the motor respectively and in alignment to carry the belt 8. The motor 2 is mounted on the base 9 which latter is pivotally supported as at 10 on an axis parallel to shafts 4 and 7 and is offset from the motor toward one side thereof.

The arm 11 projecting from the opposite side of base 9 and the base and motor thereon are supported by fluid pressure acting against the piston 12 as will be described. The piston 12 is disposed for movement within the cylindrical bore 13 formed in the cylinder body 14 which latter is secured to the base structure 1 of the lathe and above arm 11.

The rod 15 connected to piston 12 extends downwardly from the valve body 14. The link 16 connects the lower end of rod 15 and the outer end of arm 11 whereby movement of piston 12 in bore 13 effects a predetermined movement of motor 2 about the axis of pivot 10 and a corresponding adjustment of the between-centers distance of shafts 4 and 7. The increasing or decreasing of the distance between shafts 4 and 7 allows belt 8 to be removed from sheaves 5 and 6 for replacement or readjustment on the sheaves, or provides the tension or release of the belt as required for best operation and maximum length of service.

The pump 17 is driven by the motor 18 shown diagrammatically and is preferably a positive displacement pump of the type normally incorporated in the servo-control mechanism of the machine tool. Pump 17 is supplied with oil from the sump or reservoir 19 to provide a supply of fluid at a given rate to the fluid circuit 20. The relief valve 21, shown diagrammatically, within the fluid supply circuit 20 is adapted to establish a maximum pressure within circuit 20 whereby various elements of the machine tool may be operated by control valves, not shown, directly from the circuit. Circuit 20 which extends to the various control elements of the machine tool, not shown, is also connected to the cylinder body 14 to supply fluid at the established pressure to the lower end of cylinder 13 beneath piston 12. The discharge line 22 from valve 21 is connected to cylinder body 14 for delivery of fluid into the upper end of cylinder bore 13 and above piston 12.

The valve seat 23 is formed in the cylinder body 14 adjacent to bore 13 by a bore 24 having a larger end portion 25 extending therefrom. End portion 25 is threaded on its outer end and opens to the outside of the cylinder body. The valve 26 is biased against seat 23 by the spring 27 in end portion 25 and is guided by the stem 28 in the smaller bore 24. The upper end of cylinder 13 opens into the smaller bore 24 by means of passageway 41 whereby valve 26 as determined by the pressure of spring 27 allows limited discharge of the fluid from the upper end of bore 13, through passageway 41, bore 24 and end portion 25 to return passage 29. The latter is connected to reservoir 19 by means of passage 33 and conduit 30, so that the fluid released by valve 26 may return to reservoir 19.

The threaded plug 31 in the outer end of end portion 25 is adapted by rotation to adjust the compression of spring 27 and the maximum pressure maintained within the upper end of cylinder 13. The pressure supply maintained in circuit 20 connected to the lower end of cylinder 13 supplies a fluid thereto under pressure to raise piston 12 and lift arm 11. A lesser pressure is maintained in the upper end of cylinder 13 by the valve 26 and operates against the regularly established pressure within circuit 20 according to the relative effective diameters of the upper and lower parts of the piston. The relative effective pressure differential supports a predetermined portion of the weight of motor 2 on base 9 thereof as determined by the relative location of shaft 7 and pivot 10. The unsupported weight of motor 2 is utilized to effect a corresponding tensioning of belt 8 which may be varied by the adjustment of spring 27 as desired.

The passage 32 in body 14 communicates with the upper end of cylinder 13 and is connected to the return passage 33 which is connected to return conduit 30. Passage 33 is controlled by the ball 34 which normally rests on the valve seat 35 to close the passage. The stem 36 within cylinder body 14 beneath ball 34 is adapted to be lifted by the rotation of cam shaft 37 as by movement of the handle 38 whereby passage 33 is opened and the pressure within the upper end of cylinder 13 is released. The pressure maintained by circuit 20 in the lower end of cylinder 13 is then fully effective to lift motor 2 on the pivot 10 for replacement of belt 8 or the adjustment of the belt on pulleys 5 and 6 as described.

In the normal operation of the machine tool, motor 2 and pump 17 are in constant operation which provides for the predetermined support of the motor on base 9, as described, and maintains the tension of belt 8 as determined irrespective of the position of the motor within the limits allowed by the movement of piston 12. In providing for the adjustment of the belt or replacement thereof on sheaves 5 and 6, the operation of the motor is necessarily discontinued and which further necessarily discontinues the pressure supply by pump 17 operated by the motor.

The accumulator 39 connected in circuit 20 includes a diaphragm 40 which maintains a given quantity of gas within the body of the accumulator and normally serves to absorb sudden changes in pressure or flow in circuit 20.

During the period of time necessary to change a belt or readjust belt 8 on pulleys 5 and 6, the pressure within circuit 20 is maintained by pump 17 and motor 18 and is available to lift motor 2 upon release of the pressure by operation of handle 38 to release the pressure within the upper end of cylinder 13 as described. After reclosing the discharge line 30 the normal pressures above and below piston 12 within cylinder 13 may be re-established and the proper tension of belt 8 thereafter maintained as described.

The device assures the predetermined tensioning of the belt at all times during operation of the machine tool irrespective of the length of the belt 8 within the limits allowed.

The device allows for lifting of motor 2 and releasing belt 8 of all tension during the periods that the machine tool is not in operation by opening passage 33 as described any time before or soon after shutting down the lathe. The accumulator 39 maintains for a limited period of time enough energy and pressure in circuit 20 to lift the motor and release the belt after operation of pump 17 is discontinued. Circuit 20 is normally maintained closed even during periods that the lathe is not in operation so that the pressure therein is sufficient and is thus maintained to support the motor and relieve belt 8 of tension for substantial periods of time between operations.

The device provides for the quick release of the belt by instantaneous lifting of the motor upon opening of the manually operated valve to allow the belt to be shifted in a minimum length of time on the stepped sheaves as required for different operations of the machine tool.

Various embodiments of the invention may be employed within the scope of the accompanying claims.

I claim:

1. In a machine tool of the class described, a base having a headstock, a motor carried by the base below said headstock, a belt extending upwardly from said motor to drive said headstock, a cylinder carried by said base above said motor, a piston movable within said cylinder and connected to said motor to raise and lower the same, separate fluid pressure supply means connected respectively to the opposite ends of said cylinder to act against said piston to support a predetermined part of the weight thereof whereby the given unsupported weight of the motor is utilized to effect tightening of said belt, and valve means to control the hydraulic actuation of said piston between two positions in one of which the belt is maintained tight with a predetermined portion of the weight of said motor counterbalanced and in the other of which the motor is raised to release the belt for adjustment.

2. In a machine tool, a base, a driven shaft carried by said base and having a pulley, a motor for driving the machine tool including a base member pivotally supported at one side thereof on an axis parallel to said driven shaft, said motor having a drive shaft and a pulley thereon in fixed parallel alignment with said driven shaft and otherwise adjustable relative thereto on said pivotal axis, a belt mounted on said pulleys for effecting the driving connection between said motor and said driven shaft, a piston connected to the opposite side of said base member, a cylinder adapted to receive fluid under pressure for supporting said piston therein, pressure supply means connected to one end of said cylinder for lifting of the motor by fluid pressure acting against said piston and thereby decreasing the distance between said shafts, a second hydraulic pressure supply means connected to the other end of said cylinder and acting oppositely to counterbalance in part the effective pressure of said first named supply means, said first pressure supply means when opposed by said second hydraulic pressure supply means being effective to support said motor on said pivotal axis with a given force and to effect and maintain a predetermined tensioning of said belt by the weight of said motor, and a manually operable valve adapted to release said second pressure supply means for the selective lifting of the motor by pivotal movement on said axis effected by said first named pressure supply means.

References Cited in the file of this patent

UNITED STATES PATENTS

| | | |
|---|---|---|
| 683,968 | Moskowitz | Oct. 8, 1901 |
| 736,183 | Weston | Aug. 11, 1903 |
| 1,449,828 | Maimin et al. | Mar. 27, 1923 |
| 1,909,088 | Bauer | May 16, 1933 |
| 2,054,443 | Pierson | Sept. 15, 1936 |
| 2,066,560 | Evans | Jan. 5, 1937 |
| 2,156,701 | Peterson | May 2, 1939 |
| 2,555,427 | Trautman | June 5, 1951 |
| 2,666,863 | Davis et al. | Jan. 19, 1954 |